United States Patent [19]

Mazet et al.

[11] Patent Number: 5,152,896

[45] Date of Patent: Oct. 6, 1992

[54] USE OF GRAFTED CELLULOSE FOR PURIFYING WATER

[75] Inventors: Michel Mazet, Limoges; Isabelle Rigaudie, Rodez; Daniel Wattiez; Roger Chatelin, both of Lissieu; Jean-Francois Combes; Louis Gavet, both of Lyons, all of France

[73] Assignee: Institut Textile de France-Centre Technique Industriel, France

[21] Appl. No.: 641,069

[22] Filed: Jan. 14, 1991

[30] Foreign Application Priority Data

Jan. 15, 1990 [FR] France .................. 90 00760

[51] Int. Cl.⁵ ........................... C02F 1/42
[52] U.S. Cl. ........................ 210/638; 210/683; 210/500.29; 210/500.35
[58] Field of Search ........... 210/727, 683, 903, 500.35, 210/500.29, 686, 638; 427/308

[56] References Cited

U.S. PATENT DOCUMENTS

| | | |
|---|---|---|
| 3,083,118 | 3/1963 | Bridgeford ............... 427/308 X |
| 3,723,306 | 3/1973 | Bridgeford ............ 210/500.29 X |
| 4,382,864 | 5/1983 | Hashimoto et al. ........... 210/727 |
| 4,661,257 | 4/1987 | Kreevoy et al. .......... 210/903 X |

FOREIGN PATENT DOCUMENTS 2197823 3/1974 France .

*Primary Examiner*—Frank Spear
*Attorney, Agent, or Firm*—Ladas & Parry

[57] ABSTRACT

The invention relates to the use of grafted celluloses, in fibrous form, particularly paper, non-woven web, flock, yarn, woven fabric, comprising quaternary ammonium functions, for eliminating humic substances and nitrates contained in natural water or industrial sewage.

The grafted cellulose is for example obtained by radical grafting with the aid of a non-saturated monomer with quaternary ammonium function, particularly quaternized diethyl-amino-ethyl methacrylate.

Its capacity is greater than or equal to 0.2 meq/g.

6 Claims, No Drawings

USE OF GRAFTED CELLULOSE FOR PURIFYING WATER

FIELD OF THE INVENTION

The present invention relates to the use of grafted cellulose for purifying natural, particularly stagnant, water and industrial sewage, and more particularly to the elimination of the humic substances and possibly the nitrates contained therein.

BACKGROUND OF THE INVENTION

It is known that the presence of humic substances and nitrates contained in particular in natural, particularly stagnant, water prohibits direct consumption thereof. In fact, the humic substances develop unpleasant odours and are potentially carcinogenic. These humic substances are products of decomposition of plant or animal waste; they are in the form of polymers with polyaromatic structural units, of high molar mass (higher than 200,000 for the humic matter, between 2,000 and 150,000 for the humic acids, less than 2,000 for the fulvic acids). They are generally associated with nitrates of which the toxicological risks are well known.

Different ways have been sought to eliminate the humic substances and nitrates from natural water, particularly to render it drinkable.

Among possible ways, the technique employing ion exchange was not successful, despite the presence of carboxylic functions in the structure of the humic substances. In fact, in the field of ion exchange, it is well known that these substances are poisons for the resins, i.e. they are fixed very rapidly on the surface of the resin and, due to their high molar mass, the superficially fixed molecules prevent the diffusion of other molecules in the internal part of the resin.

Tests run by Applicants have shown that, with respect to the total exchange capacity of the resins, the effective exchange efficiency vis-à-vis the humic substances is only of the order of three per cent. These tests were carried out with five different types of resins, which gave very similar results, namely from 9 to 11 mg of humic substances retained per gram of resin for 300 mg potentially fixable taking into account the capacity of the resins.

Another drawback has been observed. The humic substances fixed on the surface of the resins are not extractable and the resins are therefore not regeneratable. This may be due to irreversible phenomena of adsorption of the humic substances by the resins produced in addition from the ion exchange proper.

SUMMARY OF THE INVENTION

It has now been found, and it is this which forms the subject matter of the invention, that grafted celluloses, in fibrous form, with quaternary ammonium function, could be used for eliminating the humic substances and nitrates contained in the natural water and industrial waste, under excellent conditions of efficiency and regeneration.

The exchange efficiency with this particular presentation of ion exchanger is unexpectedly equal to and even greater than 75%. Moreover, the grafted celluloses, after fixation of humic substances, were regenerated without difficulty with a sodium chloride solution and without the exchange efficiency in the subsequent use being reduced.

This result might be explained by the combination, on the one hand, of the fibrous form which presents a very large specific surface and, on the other hand, of the grafted form of the cellulose. In the presence of water, the grafts might have a certain mobility with respect to the cellulosic skeleton, rendering much more accessible the quaternary ammonium functions, and this in reversible manner, despite the high molar mass of the humic substances.

U.S. Pat. No. 4,178,438 already discloses modifying cellulose so that it comprises ion exchanger functions, and U.S. Pat. No. 4,627,920 discloses providing a solid ion exchanger support able to take various forms, resin, powders or fibers. It is true that, among all the examples mentioned in these two documents, it is indicated that the ion exchanger group may be with quaternary ammonium function. It is true that, in U.S. Pat. No. 4,627,920, it is also indicated that the support may, inter alia, be an ion exchanger paper obtained by grafting.

However, neither of these documents concerns the elimination of substances having a structure of the type such as that of humic substances, namely polymers with aromatic structural units, of high molar mass and comprising carboxylic functions. In addition, there is nothing in these documents which leads the man skilled in the art, faced with the problem of eliminating humic substances and who is acquainted with the poor results obtained with the ion exchanger resins, to make, from the multiple solutions possible, the precise choice of the invention, which combines the following three elements: fibrous form, grafted cellulose and quaternary ammonium functions.

The grafted cellulose according to the invention may be in different forms, depending on the equipment employed, for example paper, non-woven web, flock, yarn, woven fabric.

The grafted cellulose with quaternary ammonium function is preferably obtained by radical grafting of the cellulose with the aid of a non-saturated monomer with quaternary ammonium function. Among suitable monomers, the following are retained: quaternized diethyl-amino-ethyl methacrylate, quaternized dimethyl-amino-ethyl methacrylate, in chloride form, called pleximon 735 or TMAE MC 80 marketed by the firm Röhm, or trimethyl ammonium propyl methacrylamide, in chloride form, called MAPTAC.

The exchange capacity of the grafted cellulose with quaternary ammonium function is preferably at least 0.2 meq/g and preferably 0.4 meq/g.

The use of grafted cellulose in fibrous form, comprising quaternary ammonium functions adapted to eliminate the humic substances and nitrates, is particularly suitable for the production of drinking water from natural water containing said humic substances and nitrates.

DETAILED DESCRIPTION OF THE INVENTION

The invention will be more readily understood and other advantages and characteristics will appear on reading the following description of an embodiment and example of use of a grafted cellulose with quaternary ammonium functions for eliminating the humic substances and nitrates from natural water containing same.

Grafting was effected of a cellulose in the form of a non-woven web of viscose felt type of $250 g/m^2$, 0.90 m wide, by continuous in-line impregnation/padding, passage beneath electron beam and washing, under the following conditions. The impregnation bath was a 30% solution of PLEXIMON, made from an 80% mother solution. At padding, the carry-off rate was 180%. The passage at 4 m/min beneath the electron beam at an energy of 350 kw and an intensity of 3.5 mA, led to a dose of 13 kGy (1.3 MRad). Washing was effected continuously with demineralized water until a resistivity of the water extracted from the non-woven web of 10 µS was attained. All the grafting operations took place at ambient temperature.

The grafted cellulose obtained is an anion exchanger cellulose with quaternary ammonium functions, of which the exchange capacity is 0.3 meq/g.

In a first step, comparative static tests were made between the above grafted cellulose and different types of anion exchanger resins, namely A161, A162, D1, MSA1 and MSA2.

For these tests, water was artificially polluted by adding thereto 2 g/l of humic substances and 1 g/l of nitrates, which are concentrations 10 to 40 times greater than those encountered in stagnant natural water.

A determined quantity of an ion exchanger was then dispersed in a volume of this polluted water, with slight stirring.

It was observed that a balance was attained after a certain time of contact, i.e. the respective concentrations of humic substances and nitrates no longer developed. This contact time was one week for the resins and 24 hrs. for the grafted cellulose according to the invention.

The quantity of humic substances fixed by the resins was 10 mg/g on average, the results varying from 9 to 11 mg/l depending on the type of resin. With respect to the total capacity of resin employed during the test, the efficiency was of the order of 3%. By comparison, the quantity of humic substances fixed by the grafted cellulose was 90 mg/g.

With a grafted cellulose having a capacity of 0.6 meq/g employed under the same conditions, the quantity of humic substances fixed was 180 mg/g.

Complementary tests were carried out with the grafted cellulose and with water containing other types of anions and cations which are currently found in turbid natural water, namely sulfate, chloride, phosphates, sodium, calcium, and at the corresponding concentrations. The drop in efficiency of fixation of the humic substances was only 15% at maximum with respect to the preceding results.

It should be noted that the grafted cellulose fixes the nitrate ions with a virtually 100% efficiency. However, as a function of the exchange capacity available, the humic substances displace the nitrates already fixed, as they have a greater affinity towards the quaternary ammonium functions.

Dynamic tests were carried out in a module, containing 5 g of grafted cellulose according to the invention. Water with 50 mg/l of humic substances traversed the mattress of grafted cellulose at a flowrate of 5 l/min. A pressure of 0.5 bar was applied inside the module. The quantity of humic substances retained per gram of grafted cellulose was 100 mg. viz. 75% of the total content of humic substances of the water traversed. The cellulose was regenerated by a sodium chloride solution, then re-used; the results obtained remained substantially identical.

The invention is not limited to the embodiment which has just been described by way of non-limiting example, but covers all the variants thereof.

What is claimed is:

1. The use of grafted celluloses, in fibrous form, comprising quaternary ammonium functions, for eliminating humic substances and nitrates contained in natural water or industrial sewage.

2. The use according to claim 1, wherein the grafted cellulose is in the form of paper, non-woven web, flock, yarn or woven fabric.

3. The use according to claim 1, wherein the grafted cellulose is obtained by radical grafting of the cellulose with the aid of a non-saturated monomer with quaternary ammonium function.

4. The use according to claim 3, wherein the non-saturated monomer is quaternized diethyl-amino-ethyl methacrylate.

5. The use according to claim 1, wherein the ion exchange capacity of the grafted cellulose is greater than or equal to 0.2 meq/g.

6. The use according to claim 1 for producing drinking water from natural water.

* * * * *